(12) United States Patent
Rinderer

(10) Patent No.: US 6,313,405 B1
(45) Date of Patent: Nov. 6, 2001

(54) CABLE TRAY

(75) Inventor: Eric R. Rinderer, Highland, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 09/386,687

(22) Filed: Aug. 31, 1999

(51) Int. Cl.[7] .................................................. H02G 3/00
(52) U.S. Cl. ............... 174/68.3; 174/95; 174/97; 174/99 R
(58) Field of Search ................. 174/68.3, 99 R, 174/95, 97; 248/49, 72

(56) References Cited

U.S. PATENT DOCUMENTS

| | | | |
|---|---|---|---|
| 2,773,512 | * 12/1956 | Burk | 138/48 |
| 4,040,449 | * 8/1977 | Butler et al. | 138/92 |
| 4,046,343 | 9/1977 | Kambara | 248/49 |
| 4,244,545 | 1/1981 | Berry | 248/72 |
| 4,320,882 | 3/1982 | Bachle | 248/70 |
| 4,432,519 | * 2/1984 | Wright | 248/49 |
| 4,433,732 | 2/1984 | Licht et al. | 169/48 |
| 4,457,577 | 7/1984 | Browne et al. | 339/14 |
| 4,723,580 | * 2/1988 | Trautwein | 138/163 |
| 4,733,986 | 3/1988 | Kenning et al. | 403/306 |
| 5,161,580 | * 11/1992 | Klug | 138/92 |
| 5,165,453 | * 11/1992 | Walker, Jr. | 138/104 |
| 5,316,244 | * 5/1994 | Zetena et al. | 248/49 |
| 5,580,014 | 12/1996 | Rinderer | 248/49 |
| 5,639,048 | * 6/1997 | Bartholemew et al. | 248/49 |
| 5,939,680 | * 8/1999 | Gretz et al. | 174/135 |

\* cited by examiner

*Primary Examiner*—Dean A. Reichard
*Assistant Examiner*—W. David Walkenhorst
(74) *Attorney, Agent, or Firm*—Senniger, Powers, Leavitt & Roedel

(57) ABSTRACT

A cable tray including a pair of generally parallel or concentric spaced-apart metal side rails and a plurality of spaced apart rungs secured to and extending between the rails at intervals spaced along the rails. The rails and rungs define a cable fill area therebetween. The spacing of the rungs is set according to a pi spacing factor. The rails can have laterally projecting top flange members that extend outwardly in a direction away from the cable fill area and can have lower flange members that extend inwardly in a direction into the cable fill area. The top flanges have a plurality of spaced apart apertures therethrough.

41 Claims, 11 Drawing Sheets

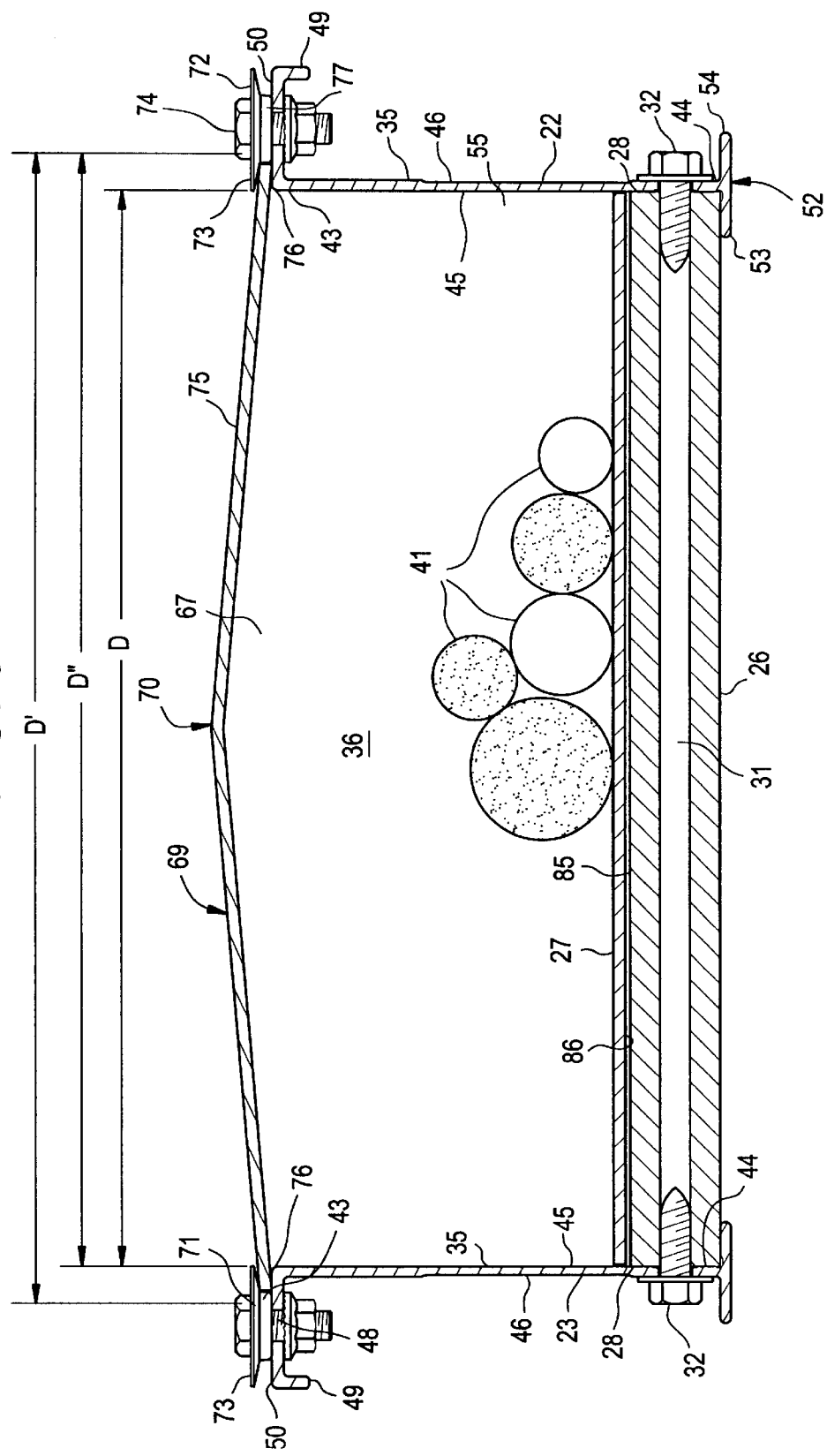

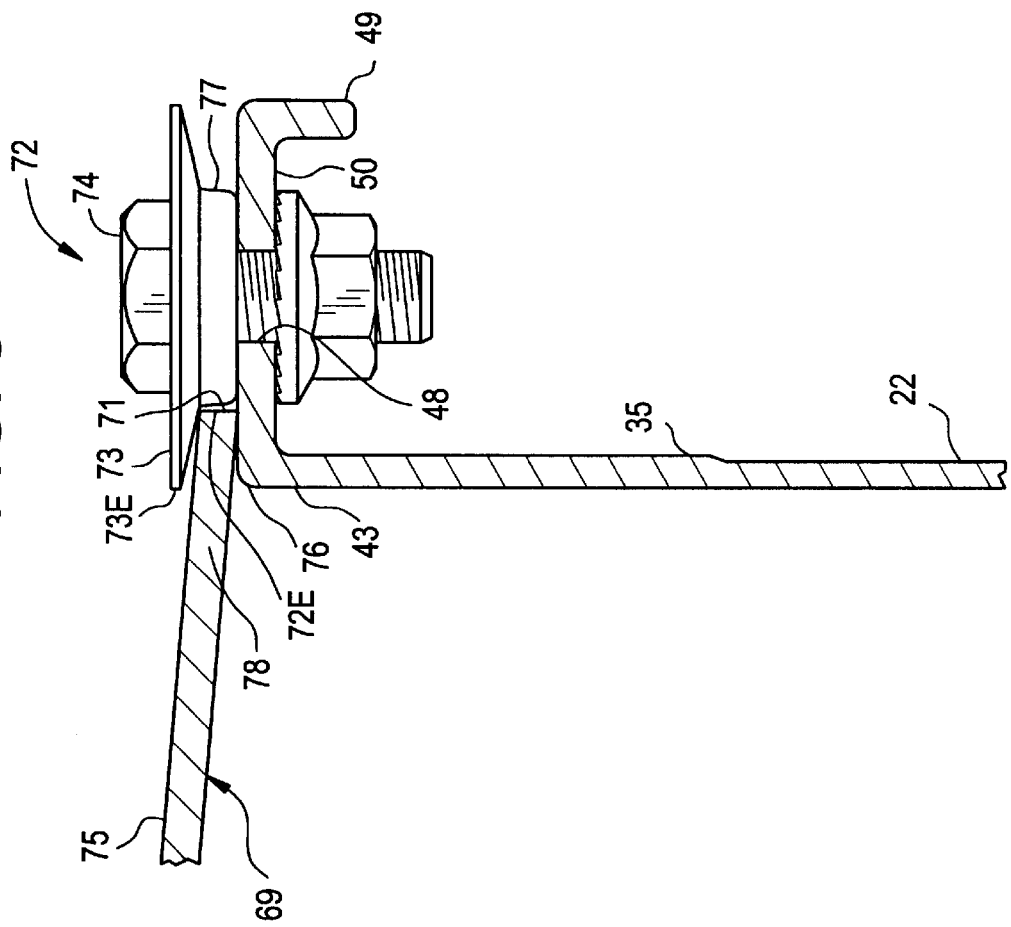

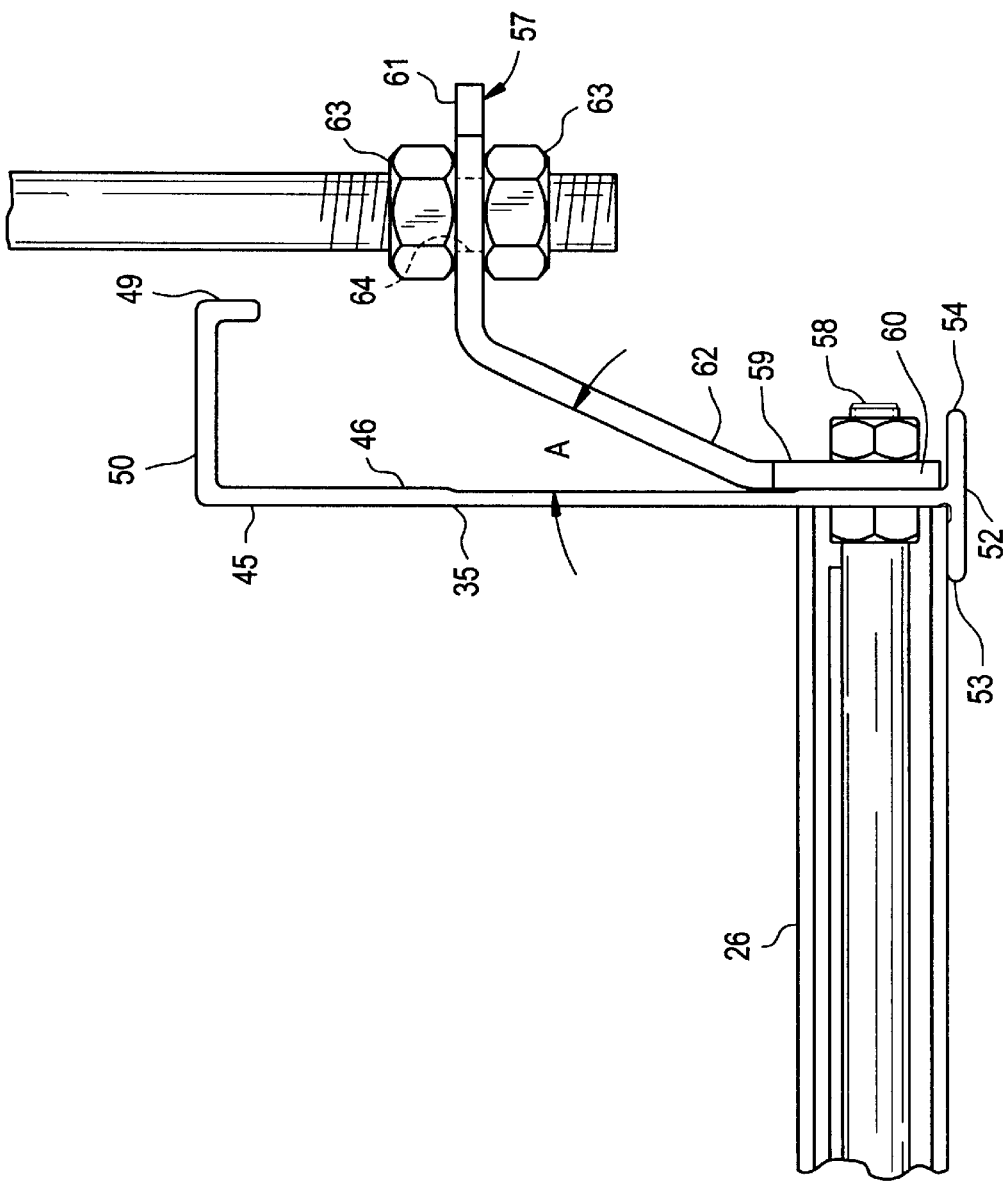

CABLE TRAY

BACKGROUND OF THE INVENTION

The present invention relates generally to support systems used in the construction industry, and more particularly to ladder-type cable trays used to support runs of cable (e.g., bundles of electrical wiring and the like).

Conventional ladder-type cable trays comprise spaced apart parallel and/or concentric side rails and a series of spaced-apart rungs extending transversely between the rails, the rails and rungs typically being of extruded aluminum alloy or other suitable formed metal. It has been the conventional practice to secure the rungs to the side rails by welding. Some cable tray systems use screw fasteners as disclosed in U.S. Pat. No. 5,580,014 to Rinderer (incorporated herein by reference).

Cable trays come in various widths and have straight sections and curved sections with various bend angles (e.g., 45°, 90°) and radii of curvature. To provide for ease of design, construction and installation, these dimensions and configurations have been standardized. In a curved (arcuate) section of cable tray the rungs extend, preferably radially, between the side rails and need to be accurately positioned to control spacing between the rungs. If the rungs are attached to the rails by mechanical fasteners (e.g., screws), accurate rung spacing requires accurately spaced apertures for receiving the fasteners. Heretofore, the spacing between these apertures has varied according to the width of the tray, its radii of curvature and its bend angle. This variation in spacing reduces manufacturing flexibility and efficiency and increases cost. Therefore, for this type of cable tray there is a need for a construction which uses a standardized fastener hole spacing which will accommodate a wide variety of tray sizes and configurations.

SUMMARY OF THE INVENTION

Among the several objects of this invention may be noted the provision of improved ladder-type cable trays of the type where the rungs are attached to the rails by mechanical fasteners; the provision of such cable trays wherein the spacing between the fastener apertures is standard to accommodate various sizes and configurations of cable trays and components; the provision of such a tray design which will permit increased manufacturing flexibility and efficiency; the provision of such a tray design that reduces the amount of tooling needed to produce the fastener apertures; the provision of a cable tray that can be suspended at various angles by bracket mounting components positioned entirely outside of the cable fill area to reduce snag points; the provision of a cable tray that has a row of apertures in the laterally extending top flanges of the side rails for ready mounting of fixtures and a cover on the cable tray and for receiving vertical support rods to suspend the tray; the provision of a cable tray section having a bottom floor panel in which the sharp end edges of the floor panel are covered to prevent damage to the contents of the tray; the provision of a cable tray assembly that comprises cable tray sections in end-to-end relation that are joined by splice plates that can be fastened in place in a manner that does not place snag points in the cable fill area; and the provision of a cable tray which is designed to avoid snagging, cutting, or other types of damage to items carried by the tray.

A first aspect of the present invention involves the provision of a cable tray section that has inside and outside rails each with a web and an arcuate section. The rails are concentric about a center point and the inside rail arcuate section is curved on an inside arc and the outside rail arcuate section is curved on an outside arc. There is a row of inside rail apertures in the web of the arcuate section of the inside rail starting adjacent one end of the arcuate section of the inside rail and continuing at substantially equally spaced intervals to a position adjacent an opposite end of the arcuate section. There is also a row of outside rail apertures in the web of the arcuate section of the outside rail starting adjacent one end of the arcuate section of the outside rail and continuing at substantially equally spaced intervals to a position adjacent an opposite end of the arcuate section. The spacing between the inside rail apertures is substantially identical to the spacing between the outside rail apertures. The apertures in the inside and outside rails are so located that radial lines passing through the center point and certain of the apertures in the inside rail also pass through corresponding apertures in the outside rail. Rungs extend between the arcuate sections of the inside and outside rails at intervals spaced along the rails. Each rung is aligned with a radial line passing through the center point and corresponding apertures in the inside and outside rails. Fasteners extend through respective apertures in the inside and outside rails into opposite ends of each rung for securing the rung to the rails.

Another aspect of the present invention involves the provision of a cable tray rail for use in a cable tray of the type comprising a plurality of spaced apart side rails and a floor extending between the side rails for supporting a plurality of cables in a cable fill area defined by the side rails and floor. The cable tray rail comprises an elongate metal beam having a central generally vertical web with opposite first and second sides and opposite first and second ends. The beam includes a generally horizontal top flange extending laterally from at least one of the first and second sides of the web, and a generally horizontal bottom flange extending laterally from at least the second side of the web. A plurality of spaced apart apertures are in the top flange.

The present invention is also directed to a cable tray section that includes a pair of rails in side-by-side spaced apart relation. The rails have webs with inside surfaces and outside surfaces with the inside surfaces facing toward one another and the outside surfaces facing away from one another. There is a row of spaced apart rail apertures in each of the webs along the length of the webs adjacent a lower portion of the webs. Rungs extend between and are secured to the rails, the rungs having upper surfaces positioned above the rows of rail apertures. At least one bracket is secured to each of the rails and has a portion extending laterally outwardly away from a respective outside rail surface. Fasteners cooperate with the brackets and extend through respective rail apertures for securing the brackets to the rails. A support member is secured to each of the brackets and suspends the cable tray section in an elevated position.

Another aspect of the present invention involves the provision of a cable tray section having a pair of spaced apart elongate side rails with webs defining side walls of a cable tray interior. The webs have top and bottom portions. An end rung extends between and is secured to the rails adjacent one end of the cable tray section and adjacent the lower edges of the rail webs. The rung has a groove extending along the length thereof adjacent a top portion of the rung and opening into the cable tray interior away from said one end of the cable tray section. A floor extends between the side rails adjacent the lower edges of the rail webs and between opposite ends of the cable tray section, the floor and portions of the webs above the floor define a cable fill area. The floor is adapted for supporting cables in the cable fill area and has an end margin received in the groove for supporting the floor in place.

An additional aspect of the present invention involves the provision of a cable tray assembly that includes a pair of cable tray sections each comprising a pair of spaced apart side rails having first and second opposite ends and a plurality of spaced apart rungs extending between and secured to respective side rails. Each side rail comprises a web with top and bottom edges and inside and outside surfaces and at least one web aperture adjacent the bottom edge and at least one of the first and second ends. Each rail further comprises a top flange adjacent the top edge of the web and projecting laterally outwardly from the outside surface. The top flange has at least one flange aperture adjacent at least one of the first and second ends. The web and flange apertures in one cable tray section of the pair of cable tray sections are positioned adjacent web and flange apertures in the other cable tray section of the pair of cable tray sections. The rungs and portions of the webs above the rungs of each cable tray section define a cable fill area. A pair of splice plates connect the cable tray sections in end-to-end relation, each splice plate having first and second legs each having at least two spaced apart apertures therein. The first legs of the two splice plates overlap the webs of respective rails and the second legs of the two splice plates overlap the top flanges of respective rails with the apertures in the first legs being aligned with web apertures in the rails and the apertures in the second legs being aligned with flange apertures in the rails. Fasteners extend through the aligned apertures for securing the rails in end-to-end relation.

The present invention also includes a cable tray section having a pair of spaced apart side rails with first and second opposite ends. Each side rail comprises a web having top and bottom edges and inside and outside surfaces and a top flange adjacent a top edge of the web and projecting laterally outwardly from the outside surface. The top flange has a row of spaced apart flange apertures extending between the first and second ends and located between an outer edge and an inner edge of the top flange. The inner edges of the top flanges of the two rails are spaced apart to define a cable tray opening extending the length of the cable tray section. A plurality of spaced apart rungs are secured to and extend between the side rails. The rungs and portions of the webs above the tops of the rungs define a cable fill area accessible via the cable tray opening. A plurality of cover retention members are secured in selected flange apertures in the top flanges of the two side rails to form two rows of cover retention members along the top flanges. A cover has opposite side edges extending along the length thereof and is adapted to fit between the two rows of cover retention members to be removably secured to the side rails in a position in which the cover closes at least a portion of the cable tray opening.

In another aspect of the present invention, a cable tray section comprises a pair of rails in side-by-side spaced apart relation. Each rail has a web with an inside surface and an outside surface, the inside surfaces facing toward one another and the outside surfaces facing away from one another. Each rail has a top flange extending laterally outwardly from the outside surface and a row of spaced apart flange apertures in the top flange. Rungs extend between and are secured to the rails. Support members are connected to the top flanges of the two rails through respective flange apertures for suspending the cable tray section in an elevated position.

Still another aspect of the present invention involves the provision of a cable tray section with a pair of spaced apart side rails having first and second opposite ends. Each side rail comprises a web having top and bottom edges and inside and outside surfaces and a top flange adjacent a top edge of the web and projecting laterally outwardly from the outside surface. The top flange has a row of spaced apart flange apertures extending between the first and second ends and located between an outer edge and an inner edge of the top flange. The inner edges of the top flanges of the two rails are spaced apart to define a cable tray opening extending the length of the cable tray section. The flange apertures in the top flanges form two rows of flange apertures. A plurality of spaced apart rungs are secured to and extend between the side rails. The rungs and portions of the webs above the tops of the rungs define a cable fill area accessible via the cable tray opening. A cover panel has opposite top and bottom surfaces and opposite side edges extending along the length thereof and is adapted to fit between the two rows of flange apertures. A plurality of straps are secured to the panel in spaced apart relation and extend from each of the side edges with a distal end portion in overlying relation to a respective top flange. Each strap has an aperture in alignment with a respective flange aperture. A plurality of fasteners extend through respective aligned strap apertures and flange apertures for removably securing the cover panel to the side rails in a position in which the cover closes at least a portion of the cable tray opening.

The present invention additionally involves the provision of a section of cable tray. The cable tray section includes a pair of rails in side-by-side spaced apart relation. The rails have webs with inside surfaces and outside surfaces with the inside surfaces facing toward one another and the outside surfaces facing away from one another. A plurality of spaced apart rail apertures are provided in each of the webs along the length of the webs adjacent a lower portion of the webs. A plurality of rungs extend between and are secured to the rails. The rungs have upper surfaces positioned above the rail apertures. The rungs are spaced apart along the length of each said rail and at least some of the rail apertures are positioned between the rungs.

Other objects and features will be in part apparent and in part pointed out hereinafter.

BRIEF DESCRIPTION OF THE DRAWINGS

FIG. 6. is a sectional view of a cable tray taken along the line 6—6 in FIG. 5.

FIG. 8 is an enlarged fragmentary view of a rail, cover retainer and a cover.

FIG. 9 is a fragmentary side elevational view of a cable tray support bracket and rail.

Corresponding reference characters indicate corresponding parts throughout the several views of the drawings.

DESCRIPTION OF THE PREFERRED EMBODIMENTS

Figure 1:
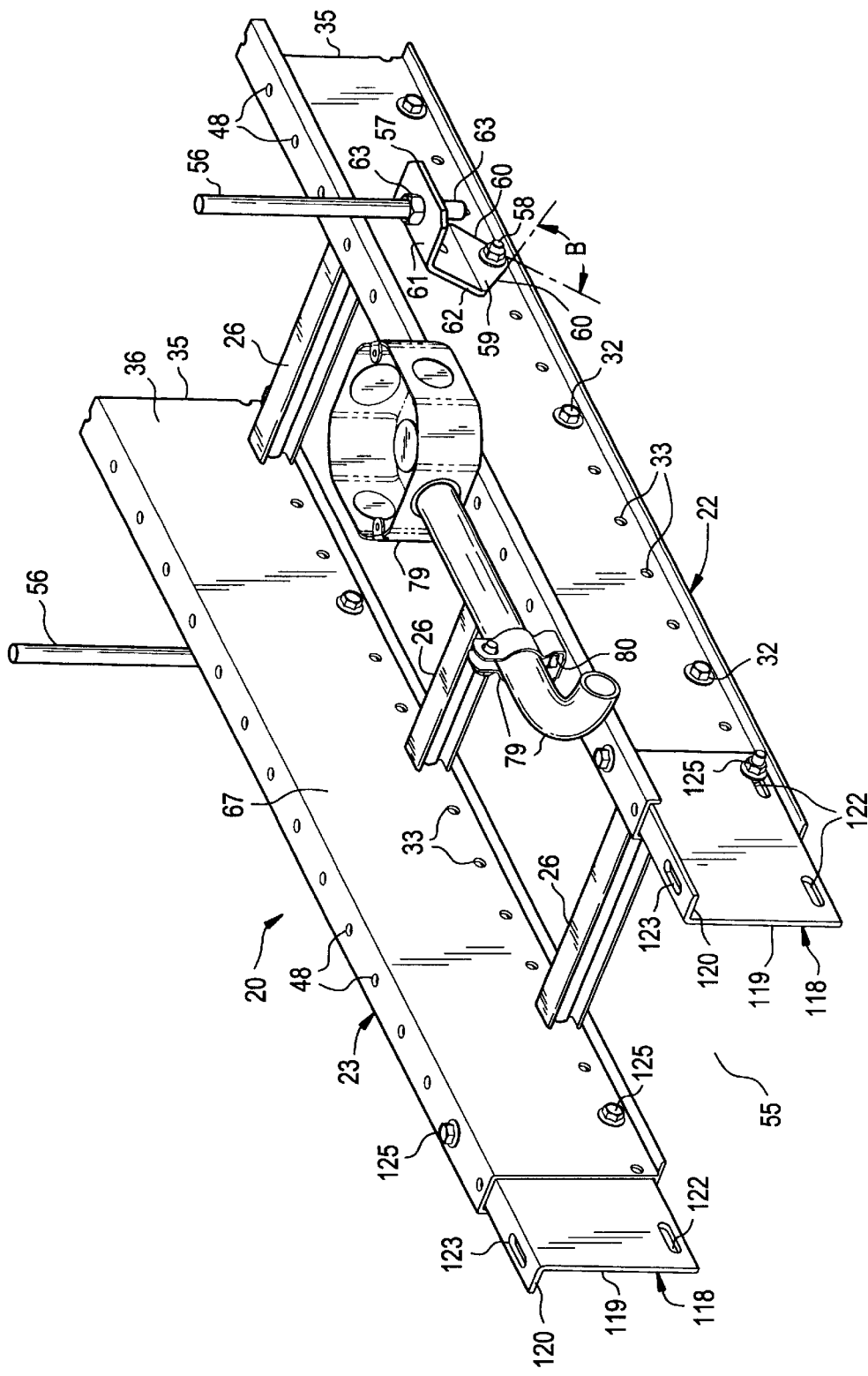
FIG. 1 is a perspective view of a straight section of a cable tray suspended by support rods.
Figure 2:
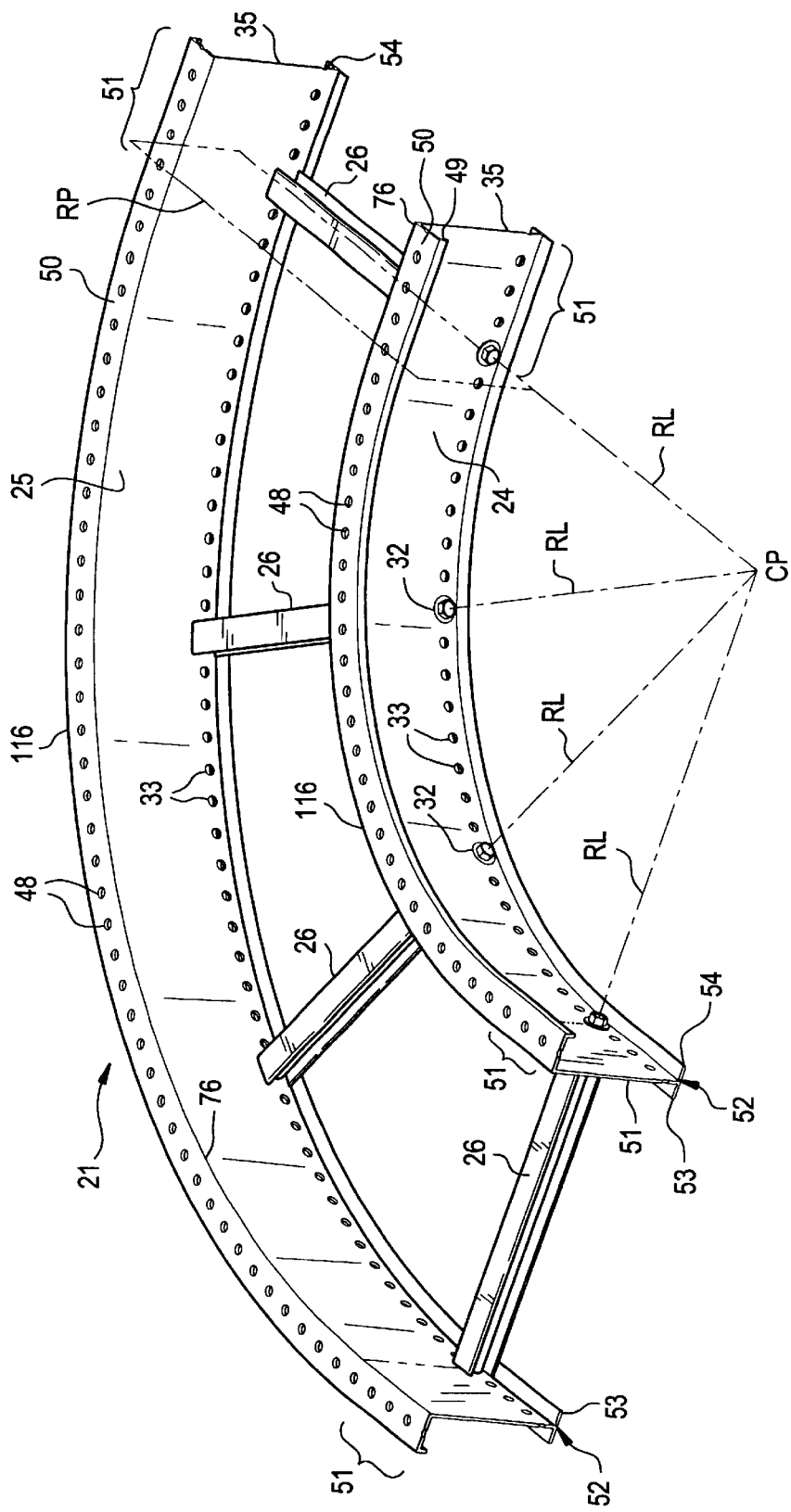
FIG. 2 is a perspective view of a curved section of a cable tray.

Referring to FIG. 1, a straight section of ladder-type cable tray of the present invention is indicated generally by the reference numeral 20. The cable tray comprises first and second generally parallel side rails designated generally as 22, 23 and a plurality of spaced apart rungs, each designated 26, secured to and extending generally transversely between the side rails. FIG. 2 shows an arcuate section of cable tray generally designated 21, comprising a pair of curved concentric spaced apart side rails 24, 25 connected by rungs, each also designated 26. The straight and curved sections 20, 21 may be connected as needed to form a desired configuration of cable tray assembly. The preferred material for the side rails and rungs of the cable tray sections 20, 21 is metal, preferably extruded aluminum alloy such as 6063-T6. The cable fill area 36 is defined by the sets of rails 22, 23, or 24, 25 and the top of the rungs 26 or the top of a floor panel 27 if one is included.

Each rung 26 has opposite ends 28, 30 which abut respective side rails 22, 23, or 24, and are suitably secured thereto by mechanical fasteners such as screw fasteners 32. Preferably the screws 32 are self tapping screws that are operable for forming threads in apertures 31 in the ends of the rungs 26 (FIG. 6), such as by rolling or cutting as known in the art. It is to be understood that the apertures 31 could be pre-threaded, if desired, in which case the screws 32 could be standard threaded bolts or screws. The screws 32 extend through spaced apart apertures 33, hereinafter described, in a web portion 35 of the side rails 22, 23, 24, 25. The screw apertures 33 are preferably located below the tops of the rungs as are the screws 32. The screws 32 are entirely outside of the cable fill area 36 to avoid snag points in the cable fill area. It is to be understood that the rungs 26 could be connected to the rails 22, 23, 24, 25 in other ways, as by welding or by a combination of welding and mechanical fasteners.

Figure 3:
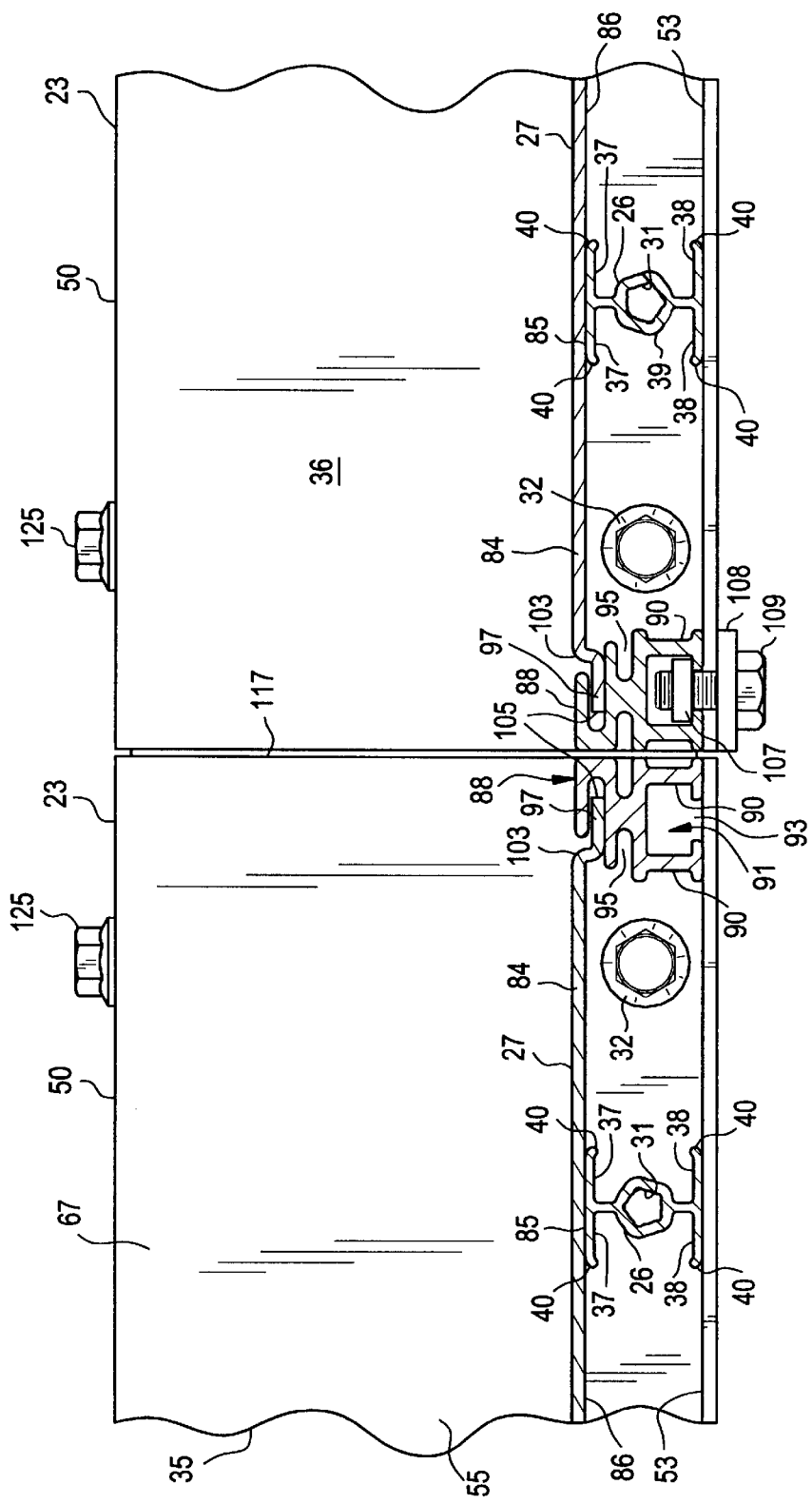
FIG. 3 is a side elevation view of two end rungs mounted in adjacent cable tray sections for supporting floor panels.

Each rung 26, as best seen in FIG. 3, has generally horizontally disposed upper and lower flanges 37, 38 respectively, and a generally vertical web 39 extending between and connecting the flanges 37, 38. Preferably the corners 40 of the rungs 26 are rounded to prevent snagging or cutting of the cable 41. The rungs 26 preferably have uniform transverse cross sections along their entire lengths to facilitate their manufacture, for example, by extrusion. Electrical cable 41 placed in the cable fill area 36, can rest on or be supported by the rungs 26 which function as a floor (or the floor panel 27, if one is used).

Figure 11:
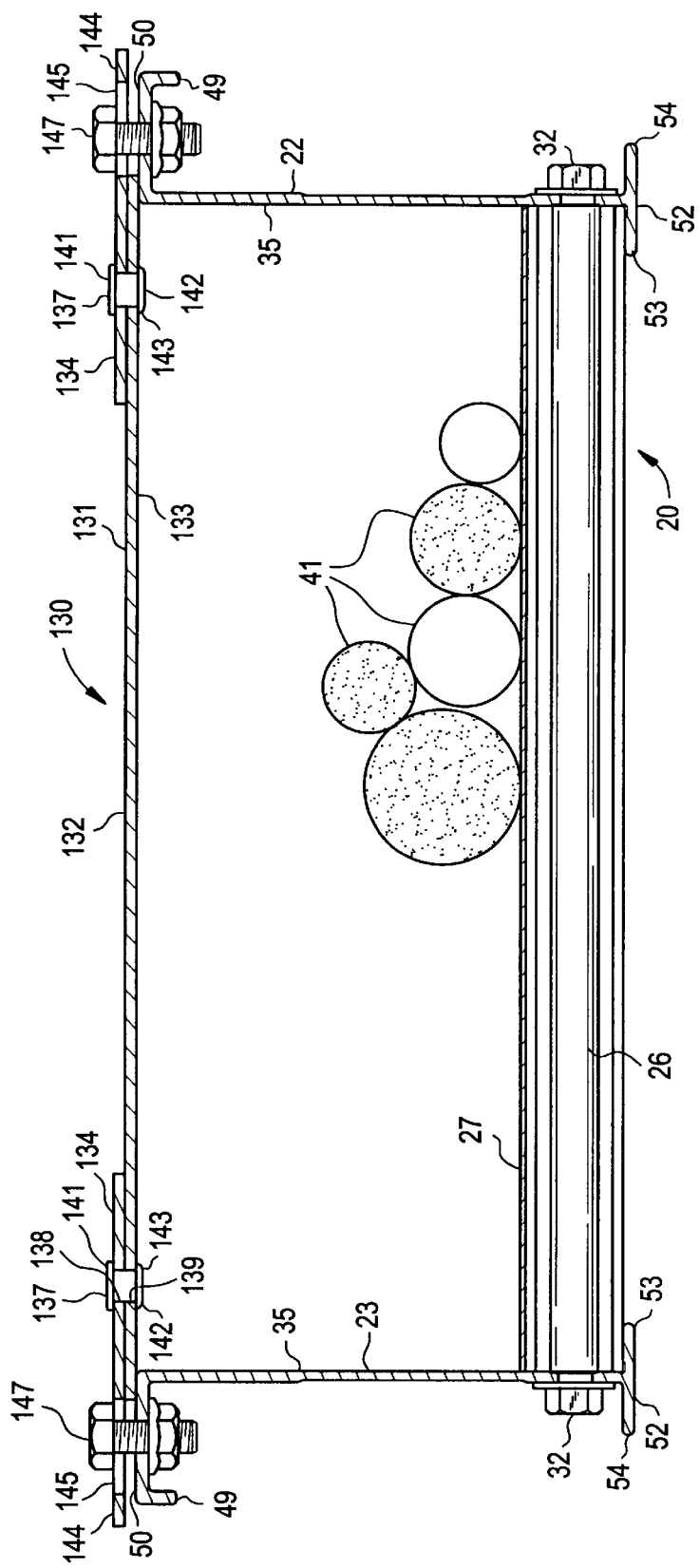
FIG. 11 is a sectional view of the cable tray of FIG. 10 taken along the line 11—11 in FIG. 10.
Figure 12:
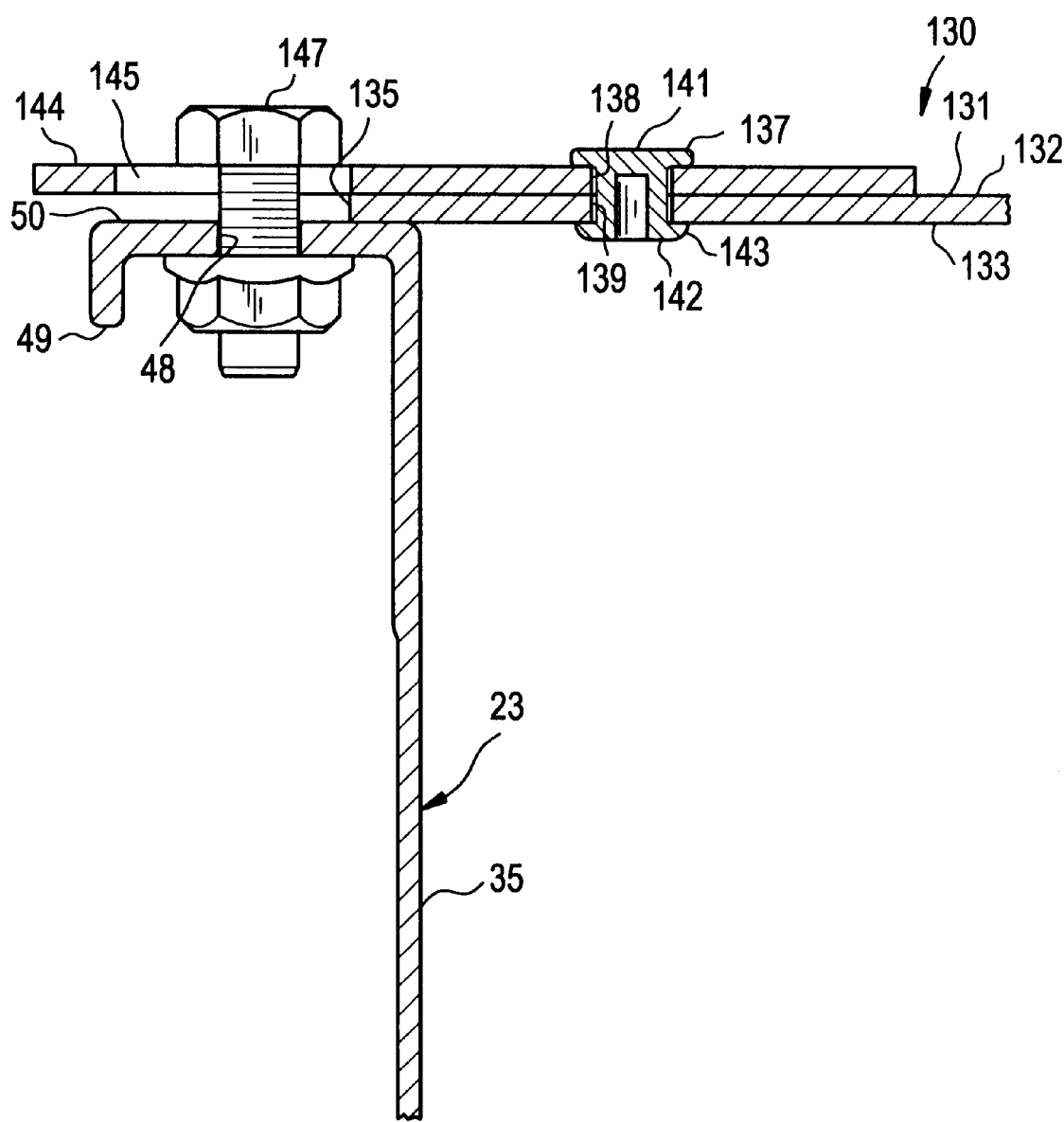
FIG. 12 is an enlarged fragmentary view of FIG. 11.

As best seen in FIGS. 1 and 2, the side rails 22, 23, 24, 25 have similar or identical cross sections along their entire lengths to facilitate manufacturing, for example, by extrusion. As best seen in FIG. 6, each side rail 22, 23, 24, 25 has a generally vertical web 35 with top and bottom portions 43 and 44, respectively, and opposite first and second sides 45, 46 each comprising a vertical generally planar face of the web. The side 45, FIG. 6, is an inner side and the side 46 is an outer side. The web 35, as best seen in FIGS. 11 and 12, is thinner in the central portion of the web than at the top and bottom portions of the web 35. This permits reduction in material usage without compromising the strength characteristics of a side rail 22, 23, 24, 25. The recess formed by the thin section is located on the outer side 46. Apertures 33 are arranged in a row and extend through the web 35 adjacent its lower edge 44. The axis of each aperture 33 is generally perpendicular to the plane of the web 35. Each rail has top and bottom flanges 50, 52, respectively, projecting laterally from the web 35 adjacent its top and bottom edges 43, 44. Preferably, the web 35 and the flanges 50, 52 are an integral structure formed for example, by extrusion. The flanges 50, 52 are preferably generally perpendicular to the web 35. In a preferred form of cable tray section 20, 21, the top flange 50 extends laterally outboard or outwardly from only one side of the web 35 so that it is out of the cable fill area 36. Alternatively or in addition to, the flange 50 could extend laterally inboard or inwardly from the web 35 so that it is in the cable fill area 36. The top flange 50 includes a plurality of apertures 48 in the rail. Preferably, there are at least two apertures 48 in a flange 50 with at least one adjacent each end of the rail. In the preferred embodiment shown, the apertures 48 are in spaced apart relation along the length of the rail. The apertures 48 are preferably positioned in a row that extends along the length of the top flange 50. The spacing and orientation of the apertures 48 relative to the web apertures 33 are discussed in detail below. The web and flange apertures 33, 48 respectively, are formed during the rail manufacturing process at one or more rail manufacturing locations. The web and flange apertures 33, 48 respectively, are preferably formed by punching however they could also be drilled. The top flange 50 has a down-turned right-angle lip 49 at its free edge spaced from and generally parallel to the web 35. The bottom flange 52 is shown as a T-flange having a first (inner) flange portion 53 extending from the inner side of the web 35 and a second (outer) flange portion 54 extending from the outer side of the web 35. Alternatively, the bottom flange 52 can be an L-flange (like the top flange 50) having only the inner flange portion 53 extending laterally inboard or inwardly into the cable tray interior 55 toward the opposite rail. The rungs 26 preferably rest on the inner flange portions 53 of the rails. If screw fasteners 32 are used for securement, the inner flange portions 53 will properly orient the rungs 26 and help prevent their rotation when the fasteners 32 are tightened. A preferred fastener is a self tapping hex washer head screw with a raised annular ring on the under side of the head available from Camcar Textron. The cable tray section interior 55 is defined by respective spaced apart side rails and includes the cable fill area 36.

The spacing between the apertures 33 in the web 35 of each rail 22, 23, 24, 25 is such as to allow radial positioning of each rung 26 when installed in a curved cable tray section 21. As seen in FIG. 2, the cable tray section 21 includes an inside rail 24 curved on an inside arc, and an outside rail 25 curved on an outside arc having a larger radius of curvature than the inside arc, the difference in radii or curvature being approximately the width of the cable tray section 21. The rails 24, 25 are curved on concentric arcs and are positioned concentrically about a common center point CP. The radius of curvature of each rail is the distance from the center point CP to the arc of the rail at the point where the rung end engages the web 35 of the rail 24, 25. (Thus, for an inside rail 24, the radius of curvature is measured from the center point CP to the inside surface 45. Similarly, for an outside rail 25, the radius of curvature is measured from the center point CP to the inside surface 45.) The apertures 33 in the inside rail 24 are located on radial lines RL passing through the center point CP and certain of the apertures 33 in the outside rail 25. When a rung 26 is secured in place, it is aligned along a radial line RL passing through the center point CP and the corresponding apertures 33. It is to be understood that not every aperture 33 on the inside rail 24 will necessarily have a corresponding radially aligned aperture 33 on the outside rail 25. However, there are sufficient apertures 33 in each of the rails 24, 25 to provide sets of radially aligned apertures 33 to obtain appropriate rung spacings. Generally, rungs 26 are spaced about every three (3) to eighteen (18) inches and preferably at about 3, 6, 9, 12, or 18 inch center-to-center spacings. For curved tray sections 21, the rung spacing is measured at the center of a cable tray section (i.e., along an arc midway between the two rails 24, 25).

As noted above, each rung 26 and the corresponding apertures 33 in the inside and outside rails 24, 25 are preferably in radial alignment, i.e., aligned on a radial line RL extending through center point CP. Since the inside and outside rails 24, 25 have different radii of curvature, such alignment might be thought to require that the apertures 33 in the inside rail 24 have a center-to-center spacing different from the spacing of the apertures in the outside rail 25, and that cable tray sections having different widths, radii of curvature and bend angles would thus necessarily require a multitude of different aperture spacings, making fabrication of the trays more expensive and requiring an inventory of a greater number of tray configurations. However, in accordance with one aspect of this invention, it has been discovered that the number of different aperture spacings can be reduced to a relatively small number of spacings which will apply to virtually all cable tray of standard width (in the range of about 6 inches through about 48 inches as more fully described below), bend angle (30°, 45°, 60°, and 90° as more fully described below) and radii of curvature (in the range of about 12 inches through about 96 inches as more fully described below). This reduction can be accomplished by spacing the apertures according to a spacing factor "S" based on pi, as explained below.

The preferred spacing factor S is as follows: S=piX/12Y where X and Y are integers. For a combination measurement system based on the metric (in centimeters) and the so called English or inch measurement systems (the English or inch system is oftentimes also referred to as the fractional measurement system), the value of X/12Y is in the range of about 1/12 through about 5, preferably in the range of about 1/8 through about 3 and most preferably in the range of about 1/8 through about 5/3. As used herein "combination measurement system" means a measurement system based on centimeters and inches. For the centimeter based system, the value of X/12Y is in the range of about 1/6 through about 5, preferably in the range of about 5/24 through about 3 and most preferably in the range of about 5/24 through about 5/3. In the inch based system, the value of X/12Y is in the range of about 1/12 through about 2, preferably in the range of about 1/8 through about 1 and most preferably in the range of about 1/8 through about 1/2. The value of S is calculated by multiplying the value of X/12y as described above for the combination, centimeter and inch based measurement systems by pi. By way of example, for the inch based measurement system, S has an approximate value of 2pi through pi/12 (i.e., the values of X/12Y are in the range of 2 through 1/12), a preferred value in the range of pi through pi/8 (i.e., the values of X/12Y are in the range of 1 through 1/8), and a more preferred value in the range of pi/2 through pi/8 (i.e., the values of X/12Y are in the range of 1/2 through 1/8). The most preferred spacing factors for an inch based system include the approximate values of pi/2, pi/3, pi/4, pi/6, and pi/8 (i.e. X/12Y is one of 1/2, 1/3, 1/4, 1/6, and 1/8). A preferred value for X for a combination measurement system is in the range of 6 through 80; for a centimeter based system, a preferred value for X is in the range of 10 through 80; and, for an inch based system, a preferred value for X is in the range of 6 through 24. A preferred value for Y for the combination, centimeter and inch based systems is 4. In the inch system, the spacing factor S would be multiplied by 1 inch to determine the hole spacing; in the centimeter system, the factor S is multiplied by 1 centimeter; and in the combination system, the factor S can be multiplied by 1 inch or 1 centimeter. By using one of these spacings, certain apertures 33 in one curved rail will radially align with certain apertures 33 in the other curved rail to ensure radial alignment of the rungs 26 in cable tray sections 21 having various radii and bend angles. Consequently, the rails 24, 25 of these tray sections 21 can utilize a common aperture spacing. The ability to use a common aperture spacing allows for the use of a single aperture forming tool to form the apertures 33. It also allows for the production of a single rail configuration that can be used for a variety of curved rails having different radii of curvature and bend angles, thus reducing the number of aperture forming tools needed and the number of different tray configurations maintained in inventory.

The following chart shows a number of preferred spacing factors "S" for an inch based system and, for each spacing factor, the cable tray configurations which can be fabricated using the same aperture spacing. The cable tray configurations are specified in terms of "bend angle," "rail radius as a function of I," and "exemplary rail radii." (As used in the chart, "bend angle" is the measured angle of arc between opposite ends of the curved portion of the cable tray; and "I" is an integer.) For example, a spacing factor S of pi/1 is applicable to any arcuate cable tray configuration having a bend angle of 30 degrees and a rail radius of curvature of 6I (e.g., 6 in.(I=1), 12 in.(I=2), 18 in.(I=3), 24 in.(I=4), etc.). If the apertures 33 in any such cable tray 21 are so spaced, certain of the apertures 33 in the inside rail 24 of the tray 21 will each be in radial alignment with a corresponding aperture in the outside rail 25, thus ensuring that a rung 26 mounted using the two corresponding apertures will be in precise radial position.

| S | Bend Angle (Degrees) | Rail Radius as a Function of I | Exemplary Rail Radii |
|---|---|---|---|
| Pi/1 | 30 | 6 I | 6, 12, 18, 24, . . . |
| Pi/1 | 45 | 4 I | 4, 8, 12, 16, . . . |
| Pi/1 | 60 | 3 I | 3, 6, 9, 12, . . . |
| Pi/1 | 90 | 2 I | 2, 4, 6, 8, . . . |
| Pi/1 | 30, 45, 60, 90 | 12 I | 12, 24, 36, 50, . . . |
| Pi/2 | 30 | 3 I | 3, 6, 9, 12, . . . |
| Pi/2 | 45 | 2 I | 2, 4, 6, 8, . . . |
| Pi/2 | 60 | (3/2) I | 3/2, 6/2, 9/2, 12/2, . . . |
| Pi/2 | 90 | I | 1, 2, 3, 4, . . . |
| Pi/2 | 30, 45, 60, 90 | 6 I | 6, 12, 18, 24, . . . |
| Pi/3 | 30 | 2 I | 2, 4, 6, 8, . . . |
| Pi/3 | 45 | (4/3) I | 4/3, 8/3, 12/3, 16/3, . . . |
| Pi/3 | 60 | I | 1, 2, 3, 4, . . . |
| Pi/3 | 90 | (2/3) I | 2/3, 4/3, 6/3, 8/3, . . . |
| Pi/3 | 30, 45, 60, 90 | 4 I | 4, 8, 12, 16, . . . |
| Pi/4 | 30 | (3/2) I | 3/2, 6/2, 9/2, 12/2, . . . |
| Pi/4 | 45 | I | 1, 2, 3, 4, . . . |
| Pi/4 | 60 | (3/4) I | 3/4, 6/4, 9/4, 12/4, . . . |
| Pi/4 | 90 | (1/2) I | 1/2, 2/2, 3/2, 4/2, . . . |
| Pi/4 | 30, 45, 60, 90 | 3 I | 3, 6, 9, 12, . . . |
| Pi/5 | 30 | (6/5) I | 6/5, 12/5, 18/5, 24/5, . . . |
| Pi/5 | 45 | (4/5) I | 4/5, 8/5, 12/5, 16/5, . . . |
| Pi/5 | 60 | (3/5) I | 3/5, 6/5, 9/5, 12/5, . . . |
| Pi/5 | 90 | (2/5) I | 2/5, 4/5, 6/5, 8/5, . . . |
| Pi/5 | 30, 45, 60, 90 | (12/5) I | 12/5, 24/5, 36/5, 50/5, . . . |
| Pi/6 | 30 | I | 1, 2, 3, 4, . . . |
| Pi/6 | 45 | (2/3) I | 2/3, 4/3, 6/3, 8/3, . . . |
| Pi/6 | 60 | (1/2) I | 1/2, 2/2, 3/2, 4/2, . . . |
| Pi/6 | 90 | (1/3) I | 1/3, 2/3, 3/3, 4/3, . . . |
| Pi/6 | 30, 45, 60, 90 | 2 I | 2, 4, 6, 8, . . . |

-continued

| S | Bend Angle (Degrees) | Rail Radius as a Function of I | Exemplary Rail Radii |
|---|---|---|---|
| Pi/7 | 30 | (6/7) I | 6/7, 12/7, 18/7, 24/7, ... |
| Pi/7 | 45 | (4/7) I | 4/7, 8/7, 12/7, 16/7, ... |
| Pi/7 | 60 | (3/7) I | 3/7, 6/7, 9/7, 12/7, ... |
| Pi/7 | 90 | (2/7) I | 2/7, 4/7, 6/7, 8/7 ... |
| Pi/7 | 30, 45, 60, 90 | (12/7) I | 12/7, 24/7, 36/7, 50/7, ... |
| Pi/8 | 30 | (3/4) I | 3/4, 6/4, 9/4, 12/4, ... |
| Pi/8 | 45 | (½) I | ½, 2/2, 3/2, 4/2, ... |
| Pi/8 | 60 | (3/8) I | 3/8, 6/8, 9/8, 12/8, ... |
| Pi/8 | 90 | (1/4) I | 1/4, 2/4, 3/4, 4/4, ... |
| Pi/8 | 30, 45, 60, 90 | (3/2) I | 3/2, 6/2, 9/2, 12/2, ... |

The pi based spacing factors "S" can be applied to both inside and outside rails 24, 25 of various radii and bend angles as described above thereby facilitating manufacturing. One "standard" rail can be made and used for straight rails 22, 23 and inside and outside curved rails 24, 25. The rails 22, 23, 24, 25 are preferably made by extrusion. The apertures 33 are formed in a rail after which the rail is bent into the various bend angles and radii. The preferred bend angles include 30°, 45°, 60°, and 90°. The preferred approximate radii for the inside rail, as measured from the center point CP to the inner surface 45 of the inside rail 24, for the inch dimension system are in the range of about 12 through about 48 inches and preferably includes approximately 12, 24, 36, and 48 inches. The radial spacing (i.e., the radial distance between the inner surfaces 45 of the rails 24, 25) between the inside rail 24 and the outside rail 25 is in the range of about 6 through about 48 inches and preferably includes approximately 6, 9, 12, 18, 24, 30, 36, and 48 inches, and the outside rail 25 radius, as measured from the center point CP to the inner surface 45 of the outside rail 25, is in the range of about 18 through about 96 inches, preferably including approximate radii of 18, 21, 24, 30, 33, 36, 42, 45, 48, 54, 57, 60, 66, 72, 78, 84, and 96 inches. Cable trays based on the centimeter system currently have bend angles of 45° and 90°, inside rail radii of 49 cm and 60 cm and tray widths of 15, 20, 30, 40, 50, and 60 cm.

The apertures 33 should have a diameter slightly larger than the diameter of the fasteners 32 to provide ease of assembly but not so much larger so as to provide excessive play. Also, the apertures 33 will have a tendency to decrease in size along the longitudinal axis of the rail, i.e., they become slightly oval with the minor axes thereof being generally parallel to the longitudinal axis of the rail, when the rail is bent to form a curved rail. The apertures 33 should be sized to accommodate this change.

In use, a cable tray assembly formed by a plurality of connected sections 20 and/or 21 is supported in an elevated position by a series of support rods 56 at intervals spaced lengthwise of the cable tray (see FIGS. 1 and 9). The supports 56 are secured to a ceiling or other structural support above the cable tray. Brackets 57 are suitably secured to the rails 22, 23, 24, 25 on the exterior sides 46 of the webs 35 by suitable fasteners 58 such as nut and bolt fasteners extending through apertures 33 in the webs and aligned apertures (not shown) in the brackets 57. The fasteners 58 allow selective pivoting of the brackets 57 relative to the rail 22, 23, 24, 25 on which they are mounted. The cable tray section 20, 21 can thus be pivoted relative to the brackets 57 to allow the cable tray section to be mounted at any angle of incline in addition to horizontal. The web apertures 33 provide multiple mounting points along the length of a cable tray section 20, 21. These points can be selected at the installation site. Using the apertures 33 also keeps the fasteners 58 below the tops of the rungs 26 and entirely out of the cable fill area 36 but inside the interior 55. The brackets 57 can be of any suitable shape, and preferably allow the rods 56 to be positioned outboard of but close to the flanges 50 to reduce stress on the brackets 57. As shown, each bracket 57 has a vertical lower end portion 59 that is positioned adjacent the web 35 and generally coplanar therewith. The lower end portion 59 has side edges 60 that define an included angle B (FIG. 1) of about 90° to allow for some rotation or pivoting of the bracket 57 without interference from the outer flanges 52. The bracket 57 also has a horizontal upper end portion 61 that is connected to the lower end portion 59 by an intermediate portion 62. Preferably, the bracket 57 is an integral structure stamped as a one piece part from a sheet of material. The end portions 59, 61 lie in generally perpendicular planes and the intermediate portion 62 extends at an angle A of about 30°–45° relative to planes of the web 35 and lower end portion 59 (FIG. 9). The intermediate and upper portions 61, 62 are long enough to allow the rods 56 to be mounted outboard of the top flanges 50 of the rails. The upper end portion 61 extends laterally away from the web 35 of the side rail and has an opening 64 (shown in hidden lines in FIG. 9) therein for receiving the lower end of a support rod 56. The ends of the rods 56 can be threaded, and nuts 63 can be positioned on opposite sides of the end portion 61 of the bracket 57 to secure or connect the rod 56 to the bracket 57. The rods 56 and brackets 57 cooperate to suspend cable tray sections 20, 21 in an elevated position. The section could be supported in other ways, such as by the support described in U.S. Pat. No. 5,100,086 (incorporated herein by reference). Also, the tray sections could be suspended by inserting the rods 56 through the apertures 68 in the top flanges 50 of the rails and then applying the nuts 63 to the rods. By using the brackets 57 or the flanges 50 at a position above the bottom of the cable tray sections 20, 21, as described, the lower ends of the rods 56 are positioned above the bottom of the cable tray sections 20, 21, thereby reducing the overall height of the cable tray section relative to the type of mounting shown in U.S. Pat. No. 5,100,086.

In another aspect of this invention, the sets of rails 22, 23, and 24, 25 and the cable tray sections 20, 21 formed therefrom, are structured to reduce the risk of damage to the cable 41 and reduce the amount of material needed to make the cable tray. In this regard the top flange 50 on each of the rails 22, 23, 24, 25 projects laterally away from the cable fill area 36, leaving an unobstructed top opening 67 for access to the cable fill area 36.

Figure 5:
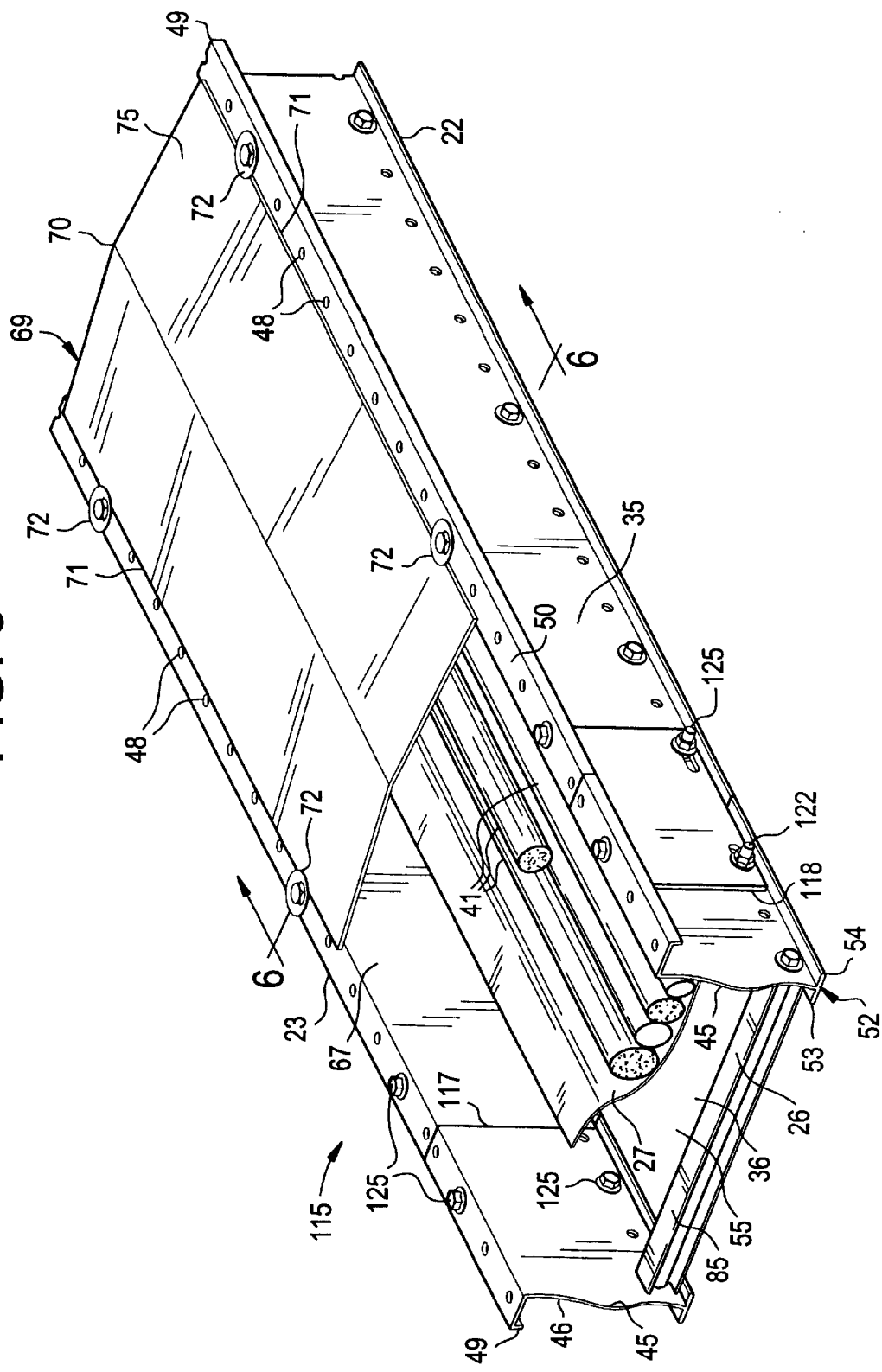
FIG. 5 is a fragmentary perspective view of a straight cable tray assembly showing two cable tray sections spliced end-to-end and a cover.

As best seen in FIGS. 5 and 6, a top cover 69 is removably mounted on the rails 22, 23, (and can be likewise mounted on the rails 24, 25) to close or seal a portion of or substantially the entirety of the top opening 67 to prevent entry of debris or the like into the cable fill area 36. As illustrated, the cover 69 is in the form of a plate bent so that it is convex upward to have an apex or center ridge 70 and parallel or concentric side edges 71. As best seen in FIGS. 6 and 8, cover retention members or retainers 72 are secured to the top flanges 50 of the rails through respective apertures 48. Preferably the retainers 72 have annular conical lips 73 that are spaced above the underlying top flange 50 to define cover receiving slots 78 therebetween. The side edges of the cover 69 are positioned in the slots 78 whereby the lips 73 overlie and engage marginal edge portions on the top surface 75 of the cover 69 to removably retain the cover 69 in position on the cable tray. As shown, the retainers 72, including the lips 73, are round, thus eliminating the need for orienting the retainers during installation. The retainers 72 are secured to the top flange 50 by suitable mechanical fasteners 74, such as bolts and nuts, portions of which extend through respective flange apertures 48. The retainers 72 can be integral with the bolt components of the fasteners 74. It is to be understood that other types of retainers can be used to retain the cover 69 on the tray.

The width of the cover 69 between its side edges 71 is greater than the transverse spacing D (FIG. 6) between the inside edges 73E of the lips 73 so as to be retained thereunder. The cover 69 width, when relaxed, is preferably equal to or slightly larger than the transverse spacing D' between the inside edges 72E of a riser 77 of the retainers 72. The width of the cover 69 is also greater than the transverse spacing between the inside edges 76 of the top flanges 50 of the rails 22, 23, 24, 25 in cable tray sections 20, 21 so that the longitudinal side edges 71 of the cover 69 will rest on and be supported by the top flanges 50. The spacing between the inside edges 73E of the lips 73 is the transverse distance D between imaginary lines (for straight rails, the lines would be straight and for curved rails, the lines would be curved) running along the innermost portions of the lips 73. Likewise, the spacing between the inside edges 72E of the retainers 72 is the transverse distance D' between imaginary lines (for straight rails, the lines would be straight and for curved rails, the lines would be curved) running along the innermost edges 72E of the riser portion 77 of the retainer 72.

The cover 69 is made of a resiliently flexible material, e.g., aluminum alloy and is adapted to be flexed from a relaxed condition in which the cover 69 has a width greater than the spacing D to a flexed condition in which the cover has a width less than the transverse spacing D" between the inside edges 72E of one row of retainers 72 and the inside edges 73E of the retainers in the other row of retainers 72. This allows the side edges 71 to be placed between the two rows of retainers 72. The cover 69 is then released to allow the cover to expand widthwise (e.g., snap) into said slots 78.

To remove the cover 69, a transverse force is applied to its side edges 71 to flex the cover 69 and reduce its transverse dimension so that the cover can be lifted off the rails. This construction makes installation and removal of the cover simple and does not require the removal of any of the fixtures 79 or fasteners 80 hereinafter described. When the cover 69 is mounted on the cable tray, the side edges 71 of the cover are preferably located inboard of the flange apertures 48 in each side rail 22, 23, 24, 25 and outboard of the flange edges 76. The cover 69 can cover some, substantially all or all of the cable tray opening 67.

Fixtures 79, such as brackets, power boxes, junction boxes, conduit clips, etc. can be secured to the top flanges 50 of the rails 22, 23, 24, 25 using the flange apertures 48 and suitable fasteners 80. Fixtures 79 that have substantial width, e.g. junction boxes, projecting toward the center of a cable tray section 20, 21, can be mounted on spacers (not shown) to provide clearance with respect to the cover 69.

As previously described, the bottom flanges 53 of the rails 22, 23, 24, 25 project laterally into the cable tray interior 55 to help support the rungs 26. The floor panel 27, shown in the form of a plate having top and bottom surfaces 84, 86, respectively, can be placed on the upper surfaces 85 of the rungs 26 to cover the rungs and bridge or cover the spaces between the rungs 26 of cable tray sections 20, 21. The floor panel 27 can be suitably secured in place, either permanently or removably. Permanent securement can be by spot welding the floor panel 27 to the rungs 26. One means of removable securement can be with double sided tape (not shown) attached to upper surfaces 85 of the rungs 26 and the bottom surface 86 of the floor panel 27.

In the manufacture of the curved rails 24, 25, a straight rail is first made and the apertures 33 and 48 are suitably formed therein. Preferably, the center-to-center spacing between the flange apertures 48 is substantially the same as the center-to-center spacing between the web apertures 33. The straight rail is then bent into a curved configuration to form a curved rail 24, 25. For an outside curved rail 25, the center-to-center spacing between apertures 48 in the top flange will increase slightly because after bending of the rail, they are positioned on an arc with a larger radius than the web apertures 33. However, even after bending, the flange apertures 48 will still lie on the radial lines described above. Conversely, on an inside curved rail 24, the center-to-center spacing apertures 48 will decrease slightly as a result of the bending because they will be positioned on an arc with a smaller radius than the apertures 33. Nevertheless, after bending, these flange apertures 48 will lie on the radial lines described above. For example, assume two rails are provided, each having a center-to-center spacing between web apertures 33 and flange apertures 48 of one inch. The rails are then bent on 12 inch (an inside rail 24) and 24 inch (an outside rail 25) radii respectively. If the centers of flange apertures 48 and the web apertures 33 are on arcs with a 0.5 inch difference in radii from the CP. The flange apertures 48 in the inside rail 22 will be moved closer together due to the bending of the rail because the flange apertures are radially closer to the CP than the web apertures 33. Conversely, the flange apertures 48 in the outside rail 23 will be moved farther apart due to the bending of the rails because the flange apertures are positioned on an arc radially farther from the CP than the web apertures 33. The opposite would be true if the rails had inboard flanges 50 as opposed to outboard flanges. The flange apertures 48 in the inside and outside rails will thus have a spacing difference with respective web apertures 33 of the inside and outside rails 24, 15 of about 0.040 and 0.020 inches, respectively. Certain of the apertures 33 and 48 in one curved rail 24, 25 will lie in common radial planes RP with certain apertures 33 and 48 in the other curved rail for a pair of curved rails forming a cable tray section 21. Flange apertures 48 are generally vertically aligned, i.e. lie on a common radial plane RP as seen in FIG. 2, with respective web apertures 33 in a curved rail 24, 25 and a straight rail 22, 23. They can also be considered to be aligned generally transversely of the longitudinal axis of the rail. The axes of the flange apertures 48 are generally perpendicular to the axes of the apertures 33 and are also generally parallel to the plane of the web 35.

Figure 7:
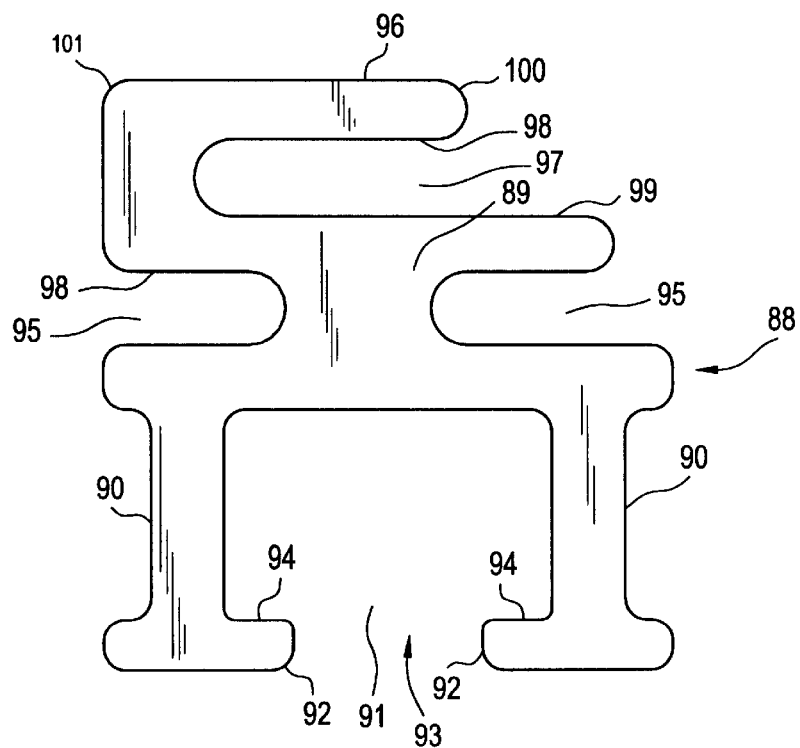
FIG. 7 is an enlarged end view of an end rung of FIG. 3.

As best seen in FIGS. 3 and 7, the cable tray sections 20, 21 can be provided with end rungs 88 that extend generally transversely between pairs of side rails 22, 23 and 24, 25. The rungs 88 are useful in securing floor panels 27 in the cable tray sections. Preferably, one floor panel 27 is used in one cable tray section and has opposite ends positioned adjacent a respective opposite ends of the tray section. The floor panel 27 rests on intermediate rungs 26 between the end rungs 88 in the cable tray section 20, 21. As shown, each end rung 88 has a central body portion 89 and two spaced apart legs 90 at opposite transverse sides of the rung 88 depending from the body portion 89. The legs 90 define a channel 91 therebetween. Each leg 90 has a foot 92 extending toward the other leg 90 defining a channel opening 93 therebetween. The feet 92 have upper surfaces forming ledges 94. The body portion 89 has two oppositely facing grooves 95 formed therein extending along the length of the end rung 88 to reduce the amount of material in the rung. The end rung 88 has an elongate horizontally extending top portion or head 96. The head 96 is spaced from the body portion 89 to form an elongate groove 97 extending longitudinally of the rung 88 and defined by a top surface 98 and a bottom surface 99. The groove 97 opens to one longitudinal side of the end rung 88. The longitudinal edges 100 and 101 of the head 96 are rounded to prevent damage to cable 41 or the like contained in the cable fill area 36. Preferably, the end rungs 88 have a uniform transverse cross sectional shape along the length thereof to facilitate manufacture, e.g., by extrusion.

When the end rungs 88 are secured in place adjacent opposite ends of a cable tray section, the grooves 97 open generally toward one another and/or into the interior 55 of the cable tray sections 20, 21, as shown in FIG. 3. The end margins 105 of the floor panels 27 extend into respective grooves 97 of the end rungs 88 to both support the floor panel 27 in the cable tray sections 20, 21 and cover the ends 105 of the floor panel to prevent their contacting the contents of the cable tray sections 20, 21. As shown in FIG. 3, the top surface 102 of the head 96 of each end rung 88 is at approximately the same height as the top surface 84 of the floor panel 27 at a rung 26 to maintain the floor panels 27 in a generally planar condition along most of its length. The floor panel 27 can be bent at 103 adjacent its ends 105 to provide a smooth transition for the cable 41 from the top of the floor panel 27 to the top of the end rungs 88.

The end rungs 88 are secured to the side rails 22, 23, 24, 25, preferably in the factory and preferably by welding. In the field, the end rungs 88 can be connected to the rails by welding or by using mechanical fasteners as seen in FIG. 3. As seen in FIG. 3, the right end rung 88 is secured in place with a mechanical fastener and the left end rung is shown as being welded in place. A preferred type of mechanical fastener includes a square nut 107 inserted in the channel 91 of each end rung 88 so that it rests on the ledges 94 (see FIG. 3). The edges of the nut 107 engage the opposing inside surfaces of the legs 90 and cannot rotate appreciably. A clamp member 108 receives a bolt 109 through a hole 110. The clamp 108 can be any suitable shape such as round or rectangular and extends laterally of the head of the bolt 109 for engaging the inner flange 53 of the side rail. The bolt 109 is threaded into the nut 107 and the clamp member 108 engages the inner flange 53 to secure the end rung 88 in place at any position along the rail. The use of a clamping type fastener eliminates the need for drilling holes for mounting the end rungs 88. The use of a clamp 108 provides contact with the flange 53 over a relatively large contact area, making positioning of the bolt 109 less critical.

Figure 4:
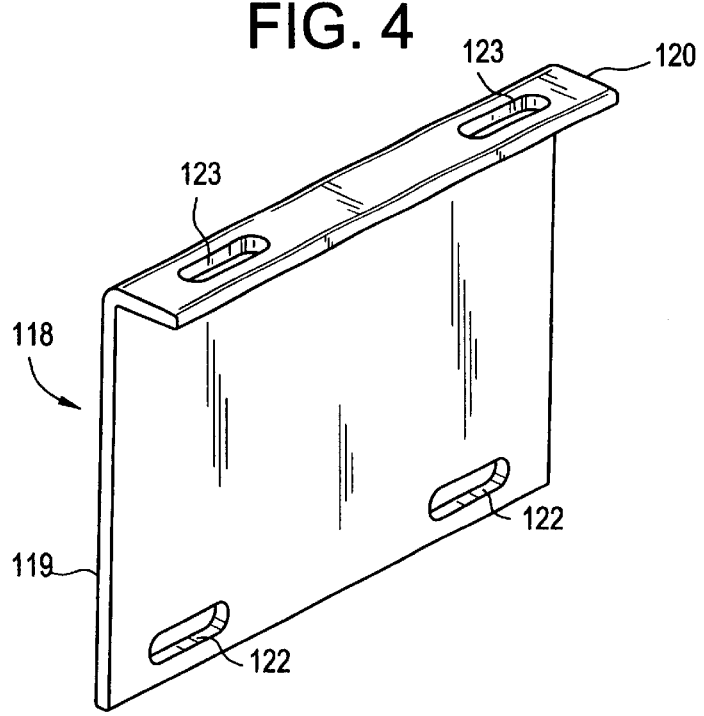
FIG. 4 is a perspective view of a rail splice plate.

Referring to FIG. 5, a cable tray assembly 115 can be made by securing a plurality of cable tray sections in end-to-end preferably abutting relation forming a joint 117 between the cable tray sections. A splice plate 118 is provided and is preferably secured to the outside surfaces 46 of the webs 35 of the end-to-end rails to bridge the joint 117. The plate 118 is generally L-shaped (FIG. 4), having two legs 119, 120 with the leg 119 being sized and shaped to overlap and engage the web 35 of two rails being spliced and the leg 120 being sized and shaped to overlap and engage the undersides of the rail flanges 50 of the end rails at a location between the web 35 and the inside edge of the lip 49 of each rail. The height of the leg 119 is approximately the same height as the web 35, and the width of the leg 120 is approximately equal to the width of the flange 50 between the web 35 and the inside edge of the lip 49.

The legs 119, 120 each have a plurality of elongate slots therein indicated at 122, 123, respectively. These slots are sized and positioned relative to the size and position of the apertures 33, 48 respectively to be aligned therewith. By being elongate along or in the direction of the length of the side rails, and by being properly sized, for example about 1 inch long, the spacing of the apertures 33, 48 from an end of the rail 22, 23, 24, 25 is not critical. Preferably, the legs 119 and 120 of the splice plates 118 do not project beyond the edges of the webs 35 and flanges 50. Suitable mechanical fasteners 125, such as threaded fasteners like bolts and nuts, can be used to secure the plates 118 in place to the rails. By extending through the apertures 33 and 48, the fasteners 125 do not extend into the cable fill area 36, thereby preventing undesirable contact with the cable 41.

To facilitate the use of the splice plates 118 with curved rails 24, 25, the end sections or portions 51 of the curved rails 24, 25 are straight and generally tangential to the curved sections 116 (FIG. 2). The end sections are relatively short.

Figure 10:
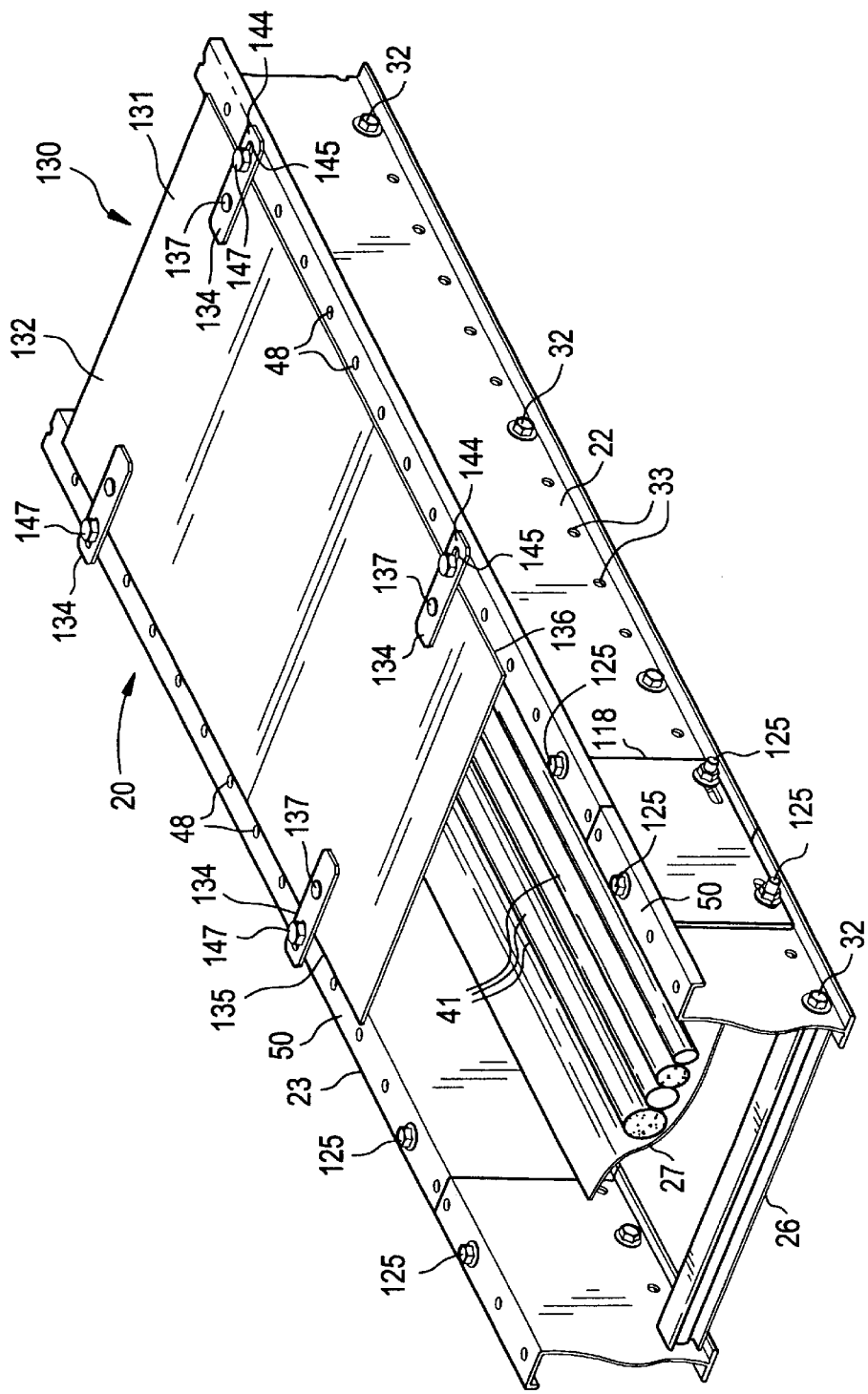
FIG. 10 is a perspective view of a cable tray with a modified cover.

FIGS. 10, 11, and 12 show a cable tray section 20 with a modified cover designated generally as 130. The cover 130 includes a generally planar panel 131 with top and bottom surfaces 132 and 133 respectively. The bottom surface 133 rests on the top of flanges 50. The panel 131 is sized to close or cover at least a portion of, substantially all of or all of the cable tray opening 67. The transverse width of the panel is less than the spacing between the inside edges of the rows of flange apertures 48. Preferably the width is less than the spacing between the inside edges of heads of fasteners 80 that are used to secure fixtures 79 to the top flanges 50. The width is wider than the spacing between the side rails 22, 23 in a cable tray section 20 and preferably wider than the spacing between the inside edges of the flange apertures 48 in one rail 22, 23 and the inside edge of the other rail 22, 23.

The panel 131 is secured to the rails 22, 23 preferably in a removable mainer. As shown, a plurality of straps 134 are secured to the panel 131 and project from opposite side edges 135, 136 of the panel. The straps 134 are positioned in spaced apart relation along the length of the panel 131 preferably a distance corresponding to a multiple of the spacing of the apertures 68. The straps 134 are secured to the panel 131 in overlying relation to the top surface 132 in any suitable manner and are preferably movable for facilitating mounting. The use of mechanical fasteners such as rivets has been found to be a preferred securement means. As shown in FIG. 12, semi-tubular rivets 137 extend through holes 138 and 139 in the straps and panel respectively. The rivet head 141 on the outside of the cable tray 20 is solid and the rivet head 142 on the inside of the cable tray has the rivet bore opening through it. The rivet head 142 has a beveled edge 143 to prevent cutting or snagging of the cable 41.

The straps 134 have a distal end portion 144 overlying the top flange 50. The straps each have an elongate slot 145 in the end portion 144 spaced from the rivet 137. The slots 145 are positioned to align with the flange apertures 48 and suitable mechanical fasteners 147 such as bolts and nuts are used to secure the cover 130 in place on the cable tray 20 by extending through a respective slot 145 and flange aperture 48. The use of a rivet 137 to secure a strap 134 to the panel allows the strap to be pivoted to provide position tolerance for aligning a slot 145 with a flange aperture 48 to receive a fastener 147 therethrough.

FIGS. 10, 11 and 12 show a modified cover 130 for a straight cable tray section 20. It is to be understood that a similar cover can be provided for a curved cable tray section 21 with the only difference being the shape of the panel 131. For a curved section, the cover 130 would have arcuate or curved edges corresponding generally to the shape of the curved rails 24, 25. When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A cable tray rail for use in a cable tray of the type comprising a plurality of spaced apart side rails and a floor extending between the side rails for supporting a plurality of cables in a cable fill area defined by said side rails and floor, said cable tray rail comprising:

an elongate metal beam having a central upright web with opposite first and second sides and opposite first and second ends, a top flange extending laterally from at least one of the first and second sides of the web, and a bottom flange extending laterally from at least one of the first and second sides of the web; and a multiplicity of upwardly opening flange apertures in the top flange extending at regularly spaced intervals along the length of the beam from adjacent one end of the beam to adjacent the opposite end of the beam, said multiplicity of flange apertures including splice flange apertures adjacent the ends of the beam for attaching splices to the beam and intermediate flange apertures between the splice apertures for attaching one or more electrical fixtures to the beam.

2. A cable tray rail as set forth in claim 1 in combination with a cover, fasteners through one or more of said intermediate flange apertures in the too flange for mounting the cover on the rail, and at least one additional fastener through another intermediate flange aperture for mounting an electrical fixture on the top flange while the cover is in place on the rail.

3. A cable tray rail as set forth in claim 2 wherein said splice apertures and said intermediate apertures are arranged along the top flange in a first row.

4. A cable tray rail as set forth in claim 3 wherein the apertures in the first row are spaced at equal intervals.

5. A cable tray rail as set forth in claim 1 including a multiplicity of laterally opening web apertures in the web of the beam extending at regularly spaced intervals along the length of the beam from adjacent one end of the beam to adjacent the opposite end of the beam, said multiplicity of web apertures including splice web apertures adjacent the ends of the beam for attaching splices to the beam, rung web apertures for attaching rungs to the beam at intervals along the beam, and non-rung web apertures between the rung web apertures for attaching one or more support fixtures to the beam at locations between the rungs.

6. A cable tray rail as set forth in claim 5 wherein said ton flange apertures are arranged in a first row extending lengthwise of the beam and said web apertures are arranged in a second row extending lengthwise of the beam, the top flange apertures being spaced at equal intervals and the web apertures being spaced at equal intervals.

7. A cable tray rail as set forth in claim 6 wherein the spacing of the apertures in the first row is equal to the spacing of the apertures in the second row.

8. A cable tray rail as set forth in claim 7 wherein the apertures in the first row are vertically aligned with respective apertures in the second row.

9. A cable tray rail as set forth in claim 5 in combination with a cover, fasteners through one or more of said intermediate flange apertures for mounting the cover on the rail, and at least one additional fastener through another intermediate flange aperture for mounting an electrical fixture on the top flange while the cover is in place on the rail.

10. A cable tray rail as set forth in claim 5 wherein said beam is arcuate with a curvature along at least a section of its length.

11. A cable tray rail as set forth in claim 10 wherein said top flange extends outwardly of the curvature and the bottom flange extends inwardly of the curvature.

12. A cable tray rail as set forth in claim 10 wherein said top flange extends inwardly of the curvature and the bottom flange extends outwardly of the curvature.

13. A section of cable tray comprising:

a pair of rails in side-by-side spaced apart relation, said rails having webs with inside surfaces and outside surfaces with the inside surfaces facing toward one another and the outside surfaces facing away from one another;

a row of spaced apart rail apertures in each of the webs along the length of the webs adjacent a lower portion of the webs;

rungs extending between and secured to the rails, said rungs having upper surfaces positioned above the rows of rail apertures;

at least one bracket secured to each of the rails and having a portion extending laterally outwardly away from a respective outside surface for engagement by a support member to support the cable tray; and fasteners cooperating with the brackets and extending through respective rail apertures for securing the brackets to the rails.

14. A cable tray section as set forth in claim 13 wherein the fasteners are operable for pivotally securing the brackets to the rails.

15. A cable tray section as set forth in claim 14 wherein each bracket has a first portion formed with a mounting opening for receiving a respective fastener to permit selective pivoting of the bracket about the fastener.

16. A cable tray section as set forth in claim 15 wherein each rail has a top flange extending laterally outwardly away from the respective outside surface of the web and wherein the brackets have end portions projecting laterally away from said outside surfaces of respective webs and outwardly of the respective top flange, said cable tray section further including a support member secured to each of the end portions for supporting the cable tray section in an elevated position with said support members being positioned outboard of respective top flanges.

17. A section of cable tray adapted for holding a plurality of cables, said cable tray section having opposite ends and comprising:

a pair of spaced apart elongate side rails having webs defining side walls of a cable tray interior, said webs having top and bottom portions;

an end rung extending between and secured to the rails adjacent one end of the cable tray section and adjacent the lower edges of the rail webs, said rung having a groove extending along the length thereof adjacent a top portion of the rung and opening into the cable tray interior away from said one end of the cable tray section; and a floor extending between the side rails adjacent the lower edges of the rail webs and between opposite ends of the cable tray section, the floor and portions of the webs above the floor defining a cable fill area, said floor being adapted for supporting cables in the cable fill area, said floor having an end margin received in said groove in the end rung for supporting the floor in place.

18. A section of cable tray as set forth in claim 17 comprising a pair of said end rungs secured to the rails adjacent opposite ends of the cable tray section, said rungs having grooves therein extending along the lengths of the end rungs and opening toward the cable tray interior for receiving end margins of said floor.

19. A section of cable tray as set forth in claim 18 wherein each rail includes an elongate metal beam having a central upright web with opposite first and second sides, a top flange extending laterally from one of the first and second sides of the web, and a bottom flange extending laterally from the second side of the web into the cable tray interior; and
    a row of apertures in the web adjacent the bottom flange extending lengthwise of the beam.

20. A section of cable tray as set forth in claim 19 including a plurality of intermediate rungs secured to the side rails and extending therebetween at locations between the end rungs, said intermediate rungs being spaced along the length of the side rails between the end rungs and being positioned under the floor and in supporting engagement therewith.

21. A cable tray assembly comprising a plurality of cable tray sections connected end-to-end by splice plates, said assembly comprising:
    a pair of cable tray sections each comprising a pair of spaced apart side rails having first and second opposite ends and a plurality of spaced apart rungs extending between and secured to respective side rails, each side rail comprising a web with top and bottom edges and inside and outside surfaces and at least one web aperture adjacent the bottom edge and at least one of the first and second ends, each rail further comprising a top flange adjacent the top edge of the web and projecting laterally outwardly from said outside surface, said top flange having at least one flange aperture adjacent at least one of the first and second ends, said web and flange apertures in one cable tray section of said pair of cable tray sections being positioned adjacent web and flange apertures in the other cable tray section of the pair of cable tray sections, the rungs and portions of the webs above the rungs of each cable tray section defining a cable fill area;
    a pair of splice plates connecting the cable tray sections in end-to-end relation, each splice plate having first and second legs each having at least two spaced apart apertures therein, said first legs of the two splice plates overlapping the webs of respective rails and the second legs of the two splice plates overlapping the top flanges of respective rails with the apertures in the first legs being aligned with web apertures in the rails and the apertures in the second legs being aligned with flange apertures in the rails; and
    fasteners extending through the aligned apertures for securing the rails in end-to-end relation.

22. A cable tray assembly as set forth in claim 21 wherein each of said splice plates has a length less than the length of each of said cable tray sections.

23. A cable tray assembly as set forth in claim 21 wherein the first legs of the two splice plates overlap the webs of respective rails on the outside surfaces of the webs.

24. A cable tray assembly as set forth in claim 23 wherein the fasteners are positioned completely outside of the cable fill areas of said cable tray sections.

25. A cable tray section comprising:
    a pair of spaced apart side rails having first and second opposite ends, each side rail comprising a web having top and bottom edges and inside and outside surfaces and a top flange adjacent a top edge of the web and projecting laterally outwardly from the outside surface, said top flange having a row of spaced apart top flange apertures extending between the first and second ends and located between an outer edge and an inner edge of the top flange, the inner edges of the top flanges of the two rails being spaced apart to define a cable tray opening extending the length of the cable tray section;
    a plurality of spaced apart rungs secured to and extending between the side rails, said rungs and portions of the webs above the tops of the rungs defining a cable fill area accessible via the cable tray opening;
    a cover having opposite side edges extending along the length thereof; and
    a plurality of cover retention members secured in selected top flange apertures in the top flanges of the two side rails to form two rows of cover retention members along the top flanges, said cover retention members removably securing the cover in a covering position in which the cover closes at least a portion of said cable tray opening and in which the opposite side edges of the cover are disposed between the two rows of cover retention members, thereby leaving top flange apertures other than said selected top flange apertures open and accessible for use when the cover is in its covering position.

26. A cable tray section as set forth in claim 25 wherein the cover is sized to close the entire cable tray opening.

27. A cable tray section comprising:
    a pair of spaced apart side rails having first and second opposite ends, each side rail comprising a web having top and bottom edges and inside and outside surfaces and a top flange adjacent a top edge of the web and projecting laterally outwardly from the outside surface, said top flange having a row of spaced apart flange apertures extending between the first and second ends of the rail and located between an outer edge and an inner edge of the top flange, the inner edges of the too flanges of the two rails being spaced apart to define a cable tray opening extending the length of the cable tray section;
    a plurality of spaced apart rungs secured to and extending between the side rails, said rungs and portions of the webs above the tops of the rungs defining a cable fill area accessible via the cable tray opening;
    a plurality of cover retention members secured in selected flange apertures in the top flanges of the two side rails to form two rows of cover retention members along the too flanges; and
    a cover having opposite side edges extending along the length thereof, the cover being adapted to fit between the two rows of cover retention members to be removably secured to the side rails in a position in which the cover closes at least a portion of said cable tray opening, said cover retention members having lips spaced above the top flanges of respective rails to define slots for receiving respective side edges of the cover thereby to removably secure the cover in position with respect to the side rails.

28. A cable tray section as set forth in claim 27 wherein the spacing between the side edges of the cover is larger than the spacing between innermost portions of the lips on one rail and innermost portions of the lips on the other rail, and wherein the spacing between the side edges of the cover is greater than the spacing between the inner edges of the top flanges.

29. A cable tray section as set forth in claim 28 wherein said cover is made of a resiliently flexible material and adapted to be flexed from a relaxed condition in which the cover has a width greater than the spacing between said two rows of cover retention members, to a flexed condition in which the cover has a width less than the spacing between said two rows so that the side edges of the cover may be placed between the two rows and the cover then released to allow the cover to expand widthwise into said slots defined by the retention members.

30. A cable tray section as set forth in claim 29 wherein the cover is convex upward.

31. A section of cable tray comprising:
   a pair of rails in side-by-side spaced apart relation, each rail having a web with an inside surface and an outside surface, the inside surfaces facing toward one another and the outside surfaces facing away from one another, a top flange extending laterally outwardly from the outside surface and a row of spaced apart flange apertures in said top flange;
   rungs extending between and secured to the rails; and
   threaded support rods connected to the top flanges of the two rails through respective flange apertures for supporting the cable tray section in an elevated position in which the support rods are disposed outside the cable tray.

32. A cable tray section as set forth in claim 31 wherein the web of each rail has a lower edge and a plurality of spaced apart web apertures in a row adjacent the lower edge, said rungs being secured to the side rails with fasteners extending through selected web apertures.

33. A cable tray section as set forth in claim 32 wherein the web apertures in each rail are spaced apart equal distances.

34. A cable tray section comprising:
   a pair of spaced apart side rails having first and second opposite ends, each side rail comprising a web having top and bottom edges and inside and outside surfaces and a top flange adjacent a top edge of the web projecting laterally outwardly from the outside surface, said top flange having a row of spaced apart top flange apertures extending between the first and second ends and located between an outer edge and an inner edge of the top flange, the inner edges of the top flanges of the two rails being spaced apart to define a cable tray opening extending the length of the cable tray section, the flange apertures in each of the top flanges forming two rows of flange apertures;
   a plurality of spaced apart rungs secured to and extending between the side rails, said rungs and portions of the webs above the tops of the rungs defining a cable fill area accessible via the cable tray opening;
   a cover panel having opposite top and bottom surfaces and opposite side edges extending along the length thereof, the cover panel being adapted to fit between the two rows of top flange apertures;
   a plurality of straps secured to the panel in spaced apart relation and extending from each of the side edges with a distal end portion in overlying relation with a respective top flange, each strap having an aperture in alignment with a respective top flange aperture; and
   a plurality of fasteners each extending through a respective aligned strap aperture and top flange aperture removably securing the cover panel to the side rails in a position in which the cover closes at least a portion of said cable tray opening.

35. A cable tray section as set forth in claim 34 wherein said straps are pivotally secured to the cover panel and the strap apertures are elongate slots.

36. A cable tray section as set forth in claim 35 wherein the cover panel is sized to close the entire cable tray opening.

37. A section of cable tray comprising:
   a pair of rails in side-by-side spaced apart relation, said rails having webs with inside surfaces and outside surfaces with the inside surfaces facing toward one another and the outside surfaces facing away from one another, said rails further having too flanges extending laterally outwardly from the webs;
   a series of flange apertures in the top flange of each rail disposed at regularly spaced intervals along the top flange from adjacent one end of the rail to adjacent an opposite end of the rail;
   a series of web apertures in the web of each rail disposed at regularly spaced intervals along the web adjacent a lower portion of the web from adjacent said one end of the rail to adjacent said opposite end of the rail; and
   rungs extending between and secured to the rails, said rungs having upper surfaces positioned above the rail apertures and said rungs being spaced apart along the length of each said rail, the spacing between adjacent web apertures in each web being less than the spacing between adjacent rungs whereby at least some of said web apertures in each web are positioned along the respective rail at locations between said rungs.

38. A section of cable tray as set forth in claim 37 wherein said spaced apart rail apertures in each rail are arranged in a row.

39. A section of cable tray as set forth in claim 38 wherein said rail apertures in each rail are spaced at equal intervals between the rungs.

40. A section of cable tray as set forth in claim 38 including a top flange extending laterally from at least one of said inside and outside surfaces of each said rail and a bottom flange extending laterally from at least one of said inside and outside surfaces of each said rail.

41. A section of cable tray as set forth in claim 37 wherein said rungs being secured to the rails with fasteners extending through respective said rail apertures.

* * * * *